United States Patent [19]
Ono

[11] Patent Number: 5,159,952
[45] Date of Patent: Nov. 3, 1992

[54] REGULATOR FOR WATER BASE PAINT

[75] Inventor: Yukihito Ono, Kawagoe, Japan

[73] Assignees: Honda Giken Kogyo Kabushiki Kaisha; Nihon Gurei Kabushiki Kaisha, both of Tokyo, Japan

[21] Appl. No.: 716,470

[22] Filed: Jun. 17, 1991

[30] Foreign Application Priority Data

Jun. 29, 1990 [JP] Japan .................. 2-68592[U]

[51] Int. Cl.$^5$ ............................................ G05D 16/08
[52] U.S. Cl. ........................ 137/505.41; 137/505.42; 251/368
[58] Field of Search ............... 137/505.39, 505.41, 137/505.42; 251/368

[56] References Cited

U.S. PATENT DOCUMENTS

| | | | |
|---|---|---|---|
| 2,816,812 | 12/1957 | Peck | 137/505.42 X |
| 3,552,431 | 1/1971 | Schmidlin | 137/505.42 |
| 3,856,042 | 12/1974 | Fletcher et al. | 137/505.42 |
| 3,911,948 | 10/1975 | Collins et al. | 251/368 X |
| 4,246,002 | 1/1981 | Bell | 251/368 X |
| 4,424,953 | 1/1984 | Takagi et al. | 251/368 |
| 4,513,778 | 4/1985 | Vadasz | 251/368 X |
| 4,693,267 | 9/1987 | Patterson | 137/505.42 X |
| 4,942,899 | 7/1990 | Vork et al. | 137/505.42 X |

Primary Examiner—Stephen M. Hepperle
Attorney, Agent, or Firm—Armstrong, Nikaido, Marmelstein, Kubovcik & Murray

[57] ABSTRACT

A regulator for water base paint has a casing with an inlet port, an outlet port and a paint chamber. The paint chamber is defined inside the casing in fluid communication with the outlet port. A valve seat is positioned between the paint chamber and the inlet port. A valve is arranged to be pressed against or released from the valve seat depending on an internal pressure in the paint chamber, thereby maintaining the delivery pressure from the outlet port constant. In the regulator having the above construction, the valve and the valve seat are made of corrosion-resistant metallic materials of different hardnesses. One of the valve and the valve seat is made of a ceramic material and the other thereof is made of sintered hard alloy.

2 Claims, 1 Drawing Sheet

REGULATOR FOR WATER BASE PAINT

BACKGROUND OF THE INVENTION

This invention relates to a regulator for water base paint which is used in a painting line of automobiles or the like.

In a conventional painting line of automobiles or the like, paint is constantly kept circulating in order to prevent the pigment and metallic particles in the paint from settling. A branch is made at a required position and the pressure of the paint is regulated by a regulator to a constant pressure before the paint is supplied to a painting head.

The construction of the regulator is as follows. Inside a casing having an inlet port and an outlet port, a paint chamber is provided in fluid communication with the outlet port. Between the paint chamber and the inlet port, there are provided a valve seat and a valve which is movable to be pressed against the valve seat or away therefrom. The valve is moved to be pressed against the valve seat or away therefrom in interlocking with a diaphragm or the like which is subjected to an internal pressure of the paint chamber, whereby the delivery or outlet pressure of the paint from the outlet port is kept constant.

It has become recent practice to use water base paint in order to prevent the environmental pollution. In such a case, the regulator is required to have corrosion resistance. Therefore, a regulator for water base paint has been developed in which the casing, the valve seat and the valve are made of stainless steel such as SUS304 or the like. In this kind of regulator, the corrosion resistivity may be satisfied. However, since the valve seat and the valve are made of the same material having the same hardness, fragile portions, if any, in the texture of the valve seat or the valve may lead to the following problems. Namely, by repeated striking of the valve against the valve seat, wear progresses in a concentrated manner at the fragile portions. This partial or uneven wear deteriorates the sealing characteristics or fluid tightness between the valve seat and the valve in a short time. This results in a shortened cycle of replacing the valve seat and the valve. It also happens that residual matters of the water base paint are likely to be adhered to these members, thereby resulting in a shortened cycle of performing maintenance.

OBJECT AND SUMMARY OF THE INVENTION

Considering the above-mentioned disadvantages, this invention has an object of providing a regulator for water base paint in which one of the valve seat and the valve wears uniformly in conformity with the other member (or in a condition to copy the shape of the other member), whereby the fluid tightness between the valve seat and the valve is maintained for a long period of time. This invention has another object of making less liable to cause the adhesion of the residual matters of the water base paint to the valve seat or the valve.

In order to attain the above object, the regulator for water base paint of this invention comprises: a casing having an inlet port, an outlet port and a paint chamber, the paint chamber being defined inside the casing in fluid communication with the outlet port; a valve seat positioned between the paint chamber and the inlet port; and a valve arranged to be pressed against or released from the valve seat depending on an internal pressure in the paint chamber, thereby maintaining the delivery pressure of the paint from the outlet port constant; wherein the valve and the valve seat are made of corrosion-resistant materials of different hardnesses.

According to another feature of this invention, in order to attain the second object, the regulator of this invention is such that one of the valve and the valve seat is made of ceramics and the other thereof is made of sintered hard alloy.

Wear takes place through repeated striking of the valve against the valve seat. However, since the valve and the valve seat are made of materials having different hardnesses, a member having a lower hardness uniformly wears in conformity with the other member, whereby partial wear in fragile portions is prevented. Consequently, the fluid tightness between the valve seat and the valve is maintained for a long period of time. The cycle in which the members must be replaced becomes longer. Further, it becomes sufficient if only the member having a lower hardness is replaced. In addition, if the combination of the materials is made between ceramics such as zirconia and sintered hard alloy such as class G, No. 3 according to JIS (Japanese Industrial Standards), it has been found that the residual matters of the paint becomes less liable to adhere to, and accumulate on, the valve seat and valve for reasons not clearly known yet.

BRIEF DESCRIPTION OF THE DRAWINGS

The above and other objects and the attendant advantages of this invention will become readily apparent by reference to the following detailed description when considered in conjunction with the accompanying drawings wherein.

DETAILED DESCRIPTION OF PREFERRED EMBODIMENTS

Figure 1:
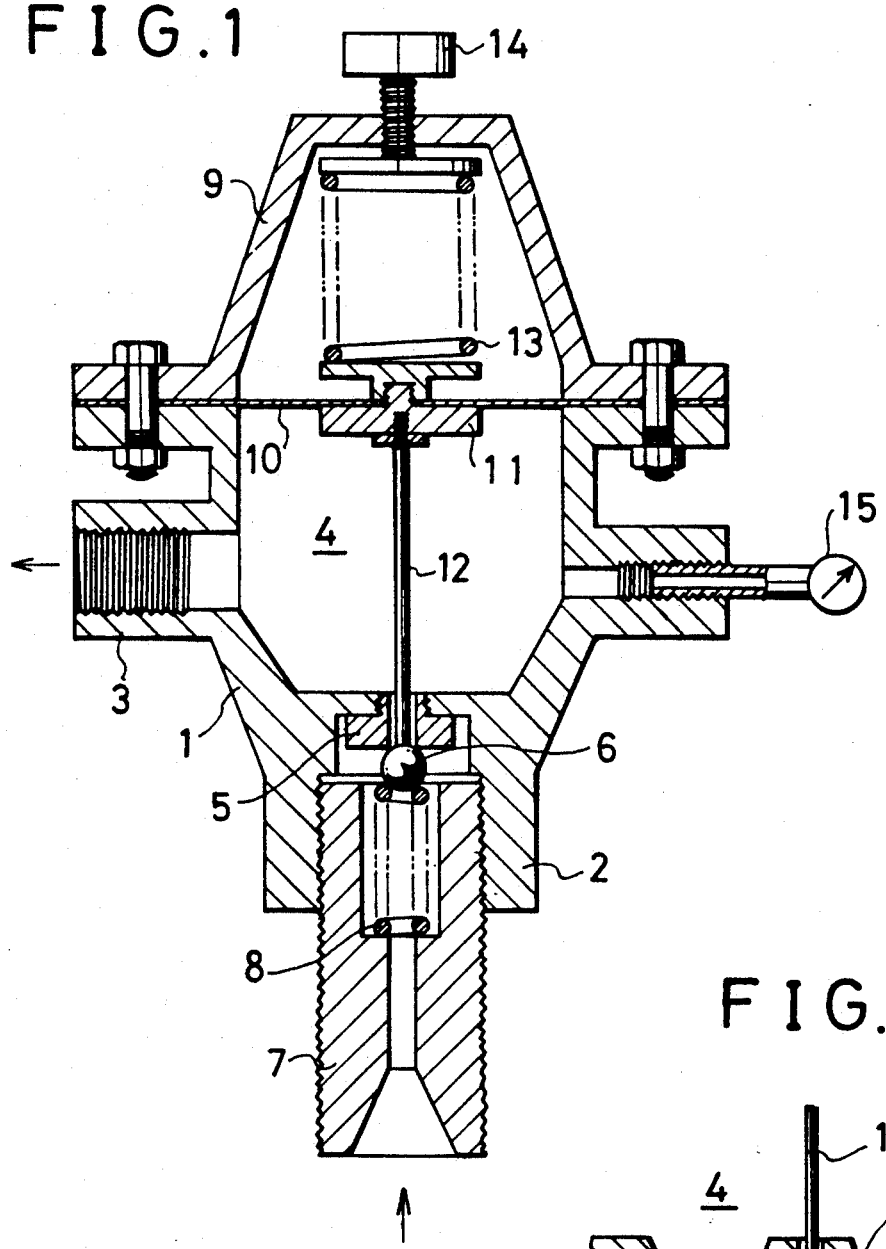
FIG. 1 is a sectional view of an embodiment of this invention regulator.

With reference to FIG. 1, a regulator comprises a casing 1 having an inlet port 2 at a lower end of the casing 1, an outlet port 3 at an upper periphery of the casing 1 and a paint chamber 4 inside the casing 1 in fluid communication with the outlet port 3. A valve seat 5 is attached in a threaded manner to a bottom wall of the paint chamber 4 from underneath thereof, i.e., from the side of the inlet port 2. A valve 6 which can be pressed against or released from the valve seat 5 from underneath thereof is provided such that the valve 6 is urged upwards, i.e., in the closing direction, by a spring 8 interposed between the valve 6 and a joint member 7 which is attached to the inlet port 2 in a threaded manner.

An upper portion of the paint chamber 4 is covered by a diaphragm 10 which is interposed between the casing 1 and a cap 9 to be placed thereon. The valve 6 is connected via an upwardly extending rod 12 to a pad member 11 which is attached to a central part of the diaphragm 10. A spring 13 to urge the diaphragm 10 downwards is contained inside the cap 9. An adjusting member 14 to hold the upper end of the spring 13 is inserted in a threaded manner through the cap 9 so that the downward urging force of the spring 13 against the diaphragm 10 can be adjusted. The reference numeral 15 denotes a pressure gauge to indicate the internal pressure of the paint chamber 4.

When the internal pressure of the paint chamber 4 decreases, the downward urging force of the spring 13 overcomes the upward urging force of the diaphragm 10 due to the internal pressure. Therefore, the valve 6 lowers and the water base paint flows into the paint chamber 4 through the clearance between the valve 6 and the valve seat 5. When the internal pressure of the paint chamber 4 consequently increases, the diaphragm 10 is pushed upwards against the urging force of the spring 13. Then, the valve 6 moves upwards and the flow of the paint into the paint chamber 4 is stopped. Through the repetition of these movements, the internal pressure of the paint chamber 4, i.e., the delivery pressure of the paint out of the outlet port 3, is maintained constant.

The valve seat 5 and the valve 6 are made of corrosion-resistant materials of different hardnesses. For example, one of them is made of SUS304 and the other is made of SUS440C that has the highest hardness among the stainless steels. Or else, one of them is made of sintered hard alloy (cemented carbide) such as class G, No. 3 according to JIS and the other is made of ceramics such as zirconia of lower hardness. The alloy of class G, No. 3 is a WC-Co based sintered hard alloy which is manufactured by mixing fine powders of tungsten carbide (WC) and cobalt (Co) as a sintering agent and thereafter sintering them. It has a composition of 83–88% W, 4–6% of C and 7–10% of Co. As zirconia, partially stabilized zirconia (PSZ) is used which holds in solid solution an MgO based or $Y_2O_3$ based stabilizing agent. As described above, when the valve seat 5 and the valve 6 are made of materials of different hardnesses, it becomes only one of them made of material of lower hardness that wears through repeated striking of both. Therefore, it becomes sufficient to replace only the one member in question that wears.

Figure 2:
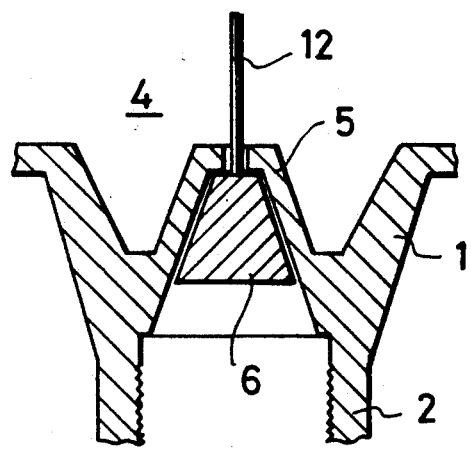
FIG. 2 is a sectional view of an important portion of another embodiment.

It is also possible to make the casing 1 of a material having a higher hardness than the valve 6 and, as illustrated in FIG. 2, to form the valve seat 5 integrally with the casing 1.

Hereinbelow are explanations about results of tests performed with regulators types 1 through 3 of FIG. 1 whose valve seats 5 and valves 6 are made of materials as shown in the table given below.

| regulator type | 1 | 2 | 3 |
|---|---|---|---|
| valve seat | SUS304 | SUS304 | sintered hard alloy class G, No. 3 |
| valve | SUS304 | SUS440C | PSZ |

Testing conditions:
paint ... acrylic emulsion based water paint
inlet pressure ... 8–10 $kg/cm^2$
outlet pressure ... 3–6 $kg/cm^2$ The duration of time during which the pressure regulating function can be obtained was checked under the above testing conditions. The time was about 10 hours with type 1 regulator and was extended to about 40 hours with type 2 regulator. With type 3 regulator, nothing abnormal happened even after use of 240 hours.

In addition, accumulation of residual or foreign matters of the paint was recognized in type 2 regulator in about 100 hours, but no accumulation thereof was recognized with type 3 regulator.

It is readily apparent that the above-described invention has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A regulator for water base paint comprising:
   a casing having an inlet port, an outlet port and a paint chamber, said paint chamber being defined inside said casing in fluid communication with said outlet port;
   a valve seat positioned between said paint chamber and said inlet port; and
   a valve arranged to be pressed against or released from said valve seat depending on an internal pressure in said paint chamber, thereby maintaining the delivery pressure of the paint from said outlet port constant;
   wherein one of said valve and said valve seat is made of a ceramic material and other of said valve and said valve seat is made of a sintered hard alloy and said ceramic material and sintered hard alloy comprise corrosion-resistant materials of different hardnesses.

2. A regulator for water base paint according to claim 2, wherein said valve seat is made integrally with said casing.

* * * * *